United States Patent [19]

Nakamura et al.

[11] 4,286,847
[45] Sep. 1, 1981

[54] LIGHTWEIGHT INVERTED TELEPHOTO TYPE WIDE ANGLE LENS SYSTEM

[75] Inventors: Akiyoshi Nakamura, Sakai; Hisashi Tokumaru, Osaka, both of Japan

[73] Assignee: Minolta Camera Kabushiki Kaisha, Osaka, Japan

[21] Appl. No.: 79,191

[22] Filed: Sep. 26, 1979

[30] Foreign Application Priority Data

Oct. 6, 1978 [JP] Japan ............... 53-123910

[51] Int. Cl.³ ............................. G02B 13/04
[52] U.S. Cl. ......................................... 350/459
[58] Field of Search ........................... 350/214, 459

[56] References Cited

U.S. PATENT DOCUMENTS

| | | | |
|---|---|---|---|
| 3,862,794 | 1/1975 | Fujii | 350/214 |
| 3,870,400 | 3/1975 | Yamashita | 350/214 |
| 4,062,622 | 12/1977 | Sugiyama | 350/214 |

*Primary Examiner*—Conrad J. Clark
*Attorney, Agent, or Firm*—Jackson, Jones & Price

[57] ABSTRACT

The present invention is directed to an inverted telephoto type wide angle lens system having eight lens groups and eight lens elements which fulfill the following conditions:

$$0.75f < |f_{1,2,3}| < 1.1f \quad\quad f_{1,2,3} < 0$$
$$0.89f < f_{1,2,3,4,5} < 2.3f$$
$$0.5 < d_7/d_6 < 2.0$$
$$1.0 < d_8/d_{10} < 2.4$$
$$1.5 < d_7/d_9 < 5.2$$

wherein $f_{1,2,3}$ represents the total focal length of the first to third single lens elements; $f_{1,2,3,4,5}$ represents the total focal length of the first to fifth single lens elements; $f$ represents the focal length of the entire lens system, and $d_i$ represents the i-th axial distance numbered consecutively from the front of the lens system.

10 Claims, 16 Drawing Figures

Spherical Aberration   Astigmatism   Distortion

Spherical Aberration   Astigmatism   Distortion

LIGHTWEIGHT INVERTED TELEPHOTO TYPE WIDE ANGLE LENS SYSTEM

BACKGROUND OF THE INVENTION

1. Field of the Invention

The present invention relates to an inverted telephoto type wide angle lens system having a relatively high aperture ratio of about 1/2.8, a relatively wide field angle reaching 84 degrees and a back focal length greater than the focal length of the lens system and more particularly to a lightweight and compact lens system.

2. Description of the Prior Art

Various different inverted telephoto type wide angle lens systems have been suggested such as those disclosed in U.S. Pat. Nos. 3,862,794 and 4,062,622. These patents respectively disclose state of the art embodiments.

The competitive rigors of the camera industry have placed a constant demand on the lens designers to provide ever increasing optical performances while further compacting and making lightweight lens systems. Accordingly, even though the prior art is crowded in attempts to achieve improved optical performance, there is still a demand to provide an improved inverted telephoto type wide angle lens system.

SUMMARY OF THE INVENTION

It is an object of the present invention to provide an improved inverted telephoto type wide angle lens system of a compact size and lightweight.

It is another object to improve an inverted telephoto type wide angle lens system while maintaining a balanced correction of aberration.

It is a further object of the present invention to provide an improved inverted telephoto type wide angle lens system of a relatively high aperture ratio of about 1/2.8 and a relatively wide field angle reaching 84 degrees with a minimized number of lens elements, such as 8-group, 8-element lens system.

The present invention is directed to an inverted telephoto type wide angle lens system having eight lens groups and eight lens elements comprising from the object to the image side, a first lens group of a first positive single lens element; a second lens group of a second negative meniscus single lens element convex to the object side; a third lens group of a third negative meniscus single lens element convex to the object side; a fourth lens group of a fourth positive single lens element; a fifth lens group of a fifth biconvex single lens element; a sixth lens group of a sixth biconcave single lens element; a seventh lens group of a positive meniscus single lens element convex to the image side, and an eighth lens group consisting of an eighth positive single lens element, in which the lens system fulfills the following conditions:

$$0.75f < |f_{1,2,3}| < 1.1f \quad f_{1,2,3} < 0$$
$$0.89f < f_{1,2,3,4,5} < 2.3f$$
$$0.5 < d_7/d_6 < 2.0$$
$$1.0 < d_8/d_{10} < 2.4$$

wherein $f_{1,2,3}$ represents the total focal length of the first to third single lens elements; $f_{1,2,3,4,5}$ represents the total focal length of the first to fifth single lens elements; $f$ represents the focal length of the entire lens system, and $d_i$ represents the i-th axial distance numbered consecutively from the front of the lens system.

The objects and features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENTS

The following description is provided to enable any person skilled in the optical art to make and use the present invention and sets forth the best modes contemplated by the inventors of carrying out their invention. Various modifications, however, will remain readily apparent to those skilled in the art, since the generic principles of the present invention have been defined herein specifically to provide a lightweight compact inverted telephoto type wide angle lens system.

The derivation of the specific parameters of the lens embodiments disclosed herein can be accomplished with the assistance of a computer. The present invention represents the parameters of a compromise balance of acceptable aberrations in a relatively easily manufactured lens assembly that is particularly suited for a single lens reflex camera. The data presented herein in the Tables, to be discussed subsequently, are more than adequate to permit a competent artisan in the optical art to reproduce the embodiments of the present invention.

In the accompanying drawings, which supplement the following Tables, the lenses in accordance with the present invention, are illustrated schematically. As usual, in conventional lens diagrams, the light is assumed to travel from left to right, and the individual lenses are designated by the letter, L, with a subscript indicating the position of the lenses as numbered consecutively from the object to image side. The radii of curvature of the lenses are indicated by the letter, r, with a subscript corresponding to the consecutive surfaces of the lens elements from left to right.

In the Tables, the minus (−) signs indicate surfaces concave toward the object side, while the surfaces without a sign are convex toward the object side. The Tables also disclose the axial spacings with the letter, d, again with a subscript indicating the distance consecutively from the left to right. The axial spacings will include both the thickness of the lens and the air spaces an equivalent comprising a group of two or more lens elements such as a doublet.

Figure 1:
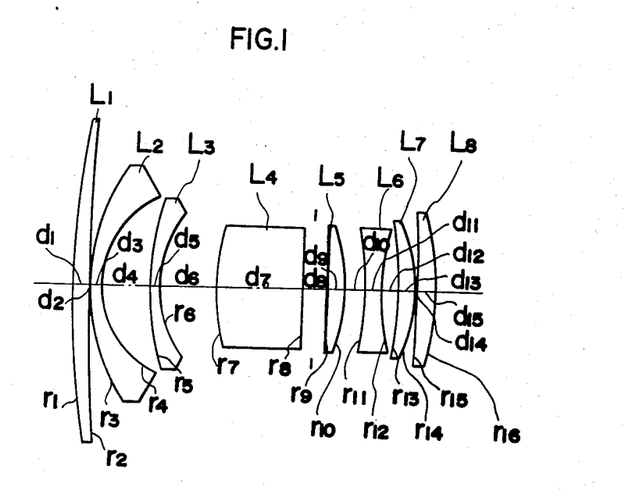
FIG. 1 represents a schematic view of a first embodiment of the present invention.
Figures 2A, 2B:
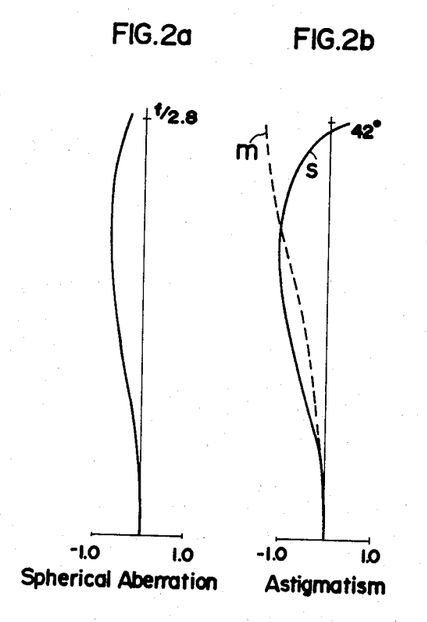
FIGS. 2a, 2b and 2c represent graphic plots of the various aberrations of the first embodiment.
Figure 2C:
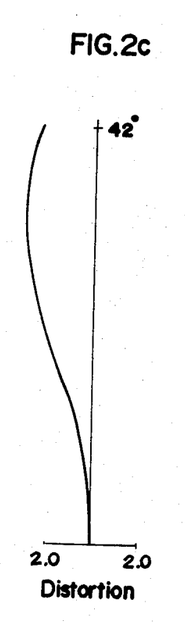
Figure 3:
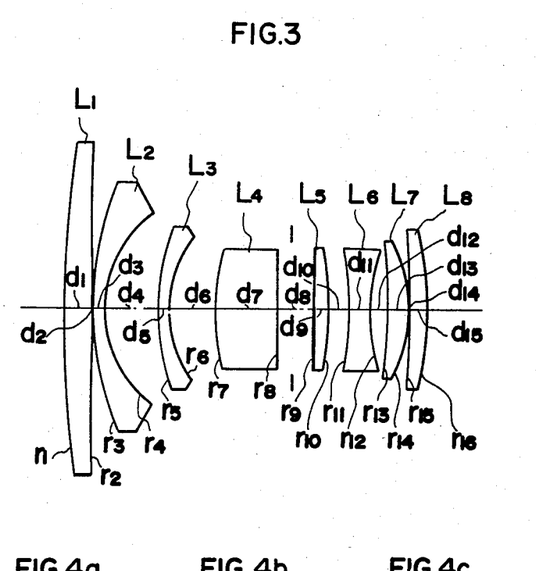
FIG. 3 represents a schematic view of a second embodiment of the present invention.
Figures 4A, 4B:
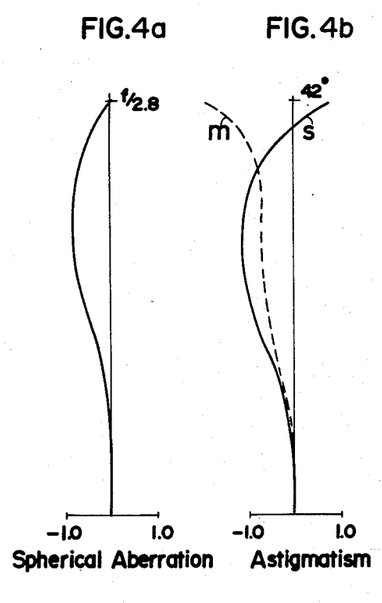
FIGS. 4a, 4b and 4c represent graphic plots of the various aberrations of the second embodiment.
Figure 4C:
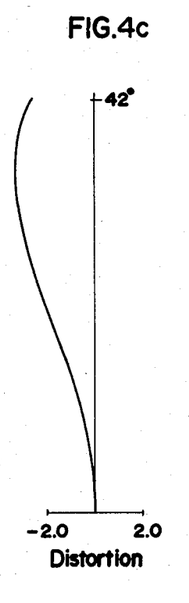
Figure 5:
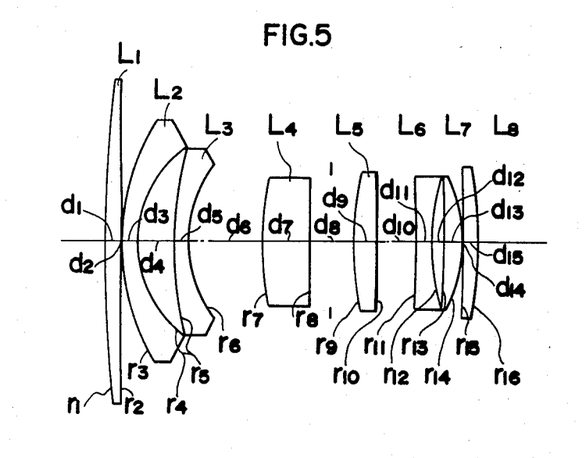
FIG. 5 represents a schematic view of a third embodiment of the present invention.
Figures 6A, 6B:
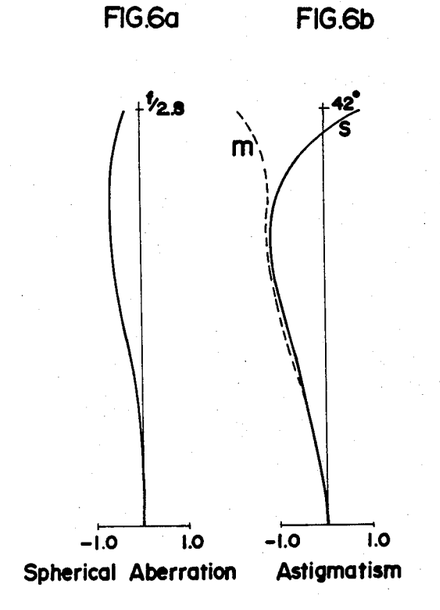
FIGS. 6a, 6b and 6c represent graphic plots of the various aberrations of the third embodiment.
Figure 6C:
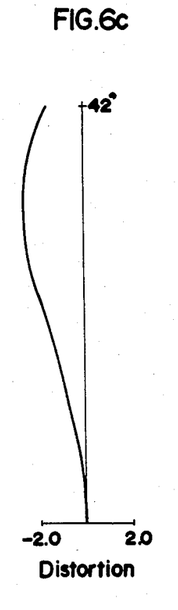
Figure 7:
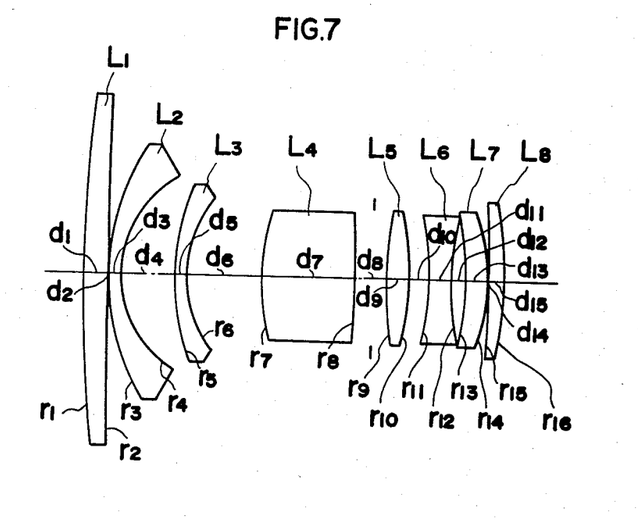
FIG. 7 represents a schematic view of a fourth embodiment of the present invention.
Figure 8A:
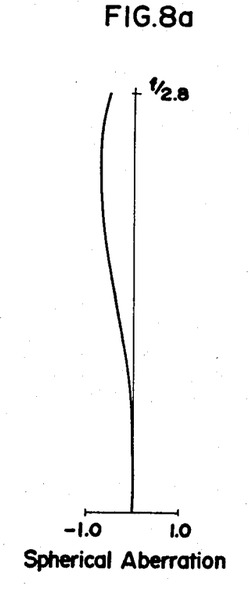
FIGS. 8a, 8b and 8c represent graphic plots of the various aberrations of the fourth embodiment.
Figure 8B:
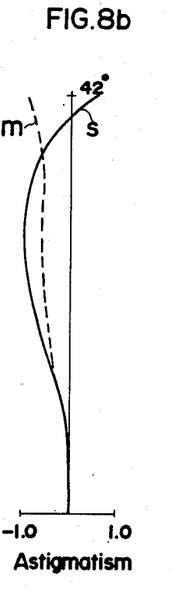
Figure 8C:
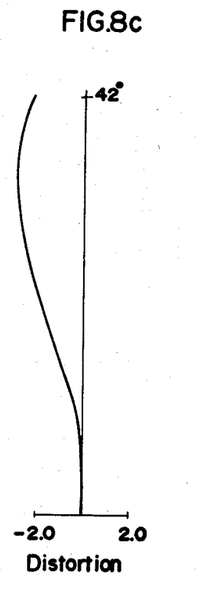

Referring to FIG. 1, a schematic lens diagram of a first embodiment of the present invention is disclosed. While the specific dimensions of the lens systems and individual lens elements will vary in the succeeding embodiments of the present invention, the general principles of the present invention can be understood with reference to FIG. 1. It should be noted that the embodiment disclosed in FIG. 7 differs in that the second lens group will comprise two separate lens elements. Also in FIG. 5, the second lens group consists of a doublet as opposed to a single lens element.

Taking these modifications into consideration, and referring to FIG. 1, the present invention can be generally defined, from the object to image side, as a first lens group ($L_1$, $L_2$ and $L_3$) consisting of a positive single lens ($L_1$), a first negative meniscus single lens ($L_2$) convex to the object side and a second negative meniscus single lens ($L_3$) convex to the object side; a second lens group ($L_4$) including at least a positive lens ($L_4$), and a third lens group ($L_5$, $L_6$, $L_7$ and $L_8$) consisting, from the object to the image side, of a first positive meniscus single lens ($L_5$) convex to the image side, a biconcave single lens ($L_6$) and a second positive meniscus single lens ($L_7$) convex to the image side and a positive single lens ($L_8$). The lens system of the present invention fulfills the following conditions:

| (1) | $0.75f <$ | $\|f_{1,2,3}\| <$ | $1.25f$, | $f_{1,2,3} < 0$ |
|---|---|---|---|---|
| (2) | $10f <$ | $f_1 <$ | $20f$ | |
| (3) | $6.5f <$ | $\|r_2\| <$ | $22f$, | $r_2 < 0$ |
| (4) | $1.3f <$ | $f_5 <$ | $1.9f$ | | wherein:

$f_{1,2,3}$ represents the focal length of the first lens group ($L_1$, $L_2$ and $L_3$);

$f_1$ represents the focal length of the positive single lens ($L_1$) in the first lens group;

$r_2$ represents the radius of curvature of the image side surface ($r_2$) of the positive single lens ($L_1$) in the first lens group;

$f_5$ represents the focal length of the first positive meniscus single lens ($L_5$) in third lens group; and f represents the focal length of the whole lens system.

Above conditions (1), (2) and (3) relate to the first lens group located at the front of the lens system. According to the present invention, the front positive lens ($L_1$) is given a relatively weak positive refractive power in contrast with the prior art to lessen the negative refractive powers required of the subsequent pair of negative meniscus lenses ($L_2$ and $L_3$) for achieving a necessary negative refractive power of the first lens group ($L_1$, $L_2$, and $L_3$) as a whole. This design approach reduces the aberrations generated in the first lens group ($L_1$, $L_2$ and $L_3$). The first lens group ($L_1$, $L_2$ and $L_3$) of the present invention is further characterized by the specific shape of the front positive lens ($L_1$) to insure a sufficient illumination of the marginal area of an image in the focal plane.

Specifically, condition (1) defines the negative refractive power of the first lens group ($L_1$, $L_2$ and $L_3$). If $|f_{1,2,3}|$ is excessively reduced to violate the lower limit of condition (1), then the first lens group ($L_1$, $L_2$ and $L_3$) will have an excessive negative refractive power which increases both the negative distortion and astigmatism to a degree that they cannot be practically corrected by the remaining image side lens group ($L_4$ to $L_8$). If the upper limit of the range is violated then a desirable long back focal length of the system cannot be obtained because of insufficient negative refractive power of the first lens group ($L_1$, $L_2$ and $L_3$).

Conditions (2) and (3) define the refractive power and shape of the front lens ($L_1$). If $f_1$ is reduced below the lower limit of condition (2), the positive refractive power of the front lens ($L_1$) will be so strong that greater negative refractive powers would have to be provided to the pair of negative meniscus lenses ($L_2$ and $L_3$) to maintain the overall necessary negative refractive power of the first lens group ($L_1$, $L_2$ and $L_3$). By providing such strong refractive powers for lenses ($L_1$), ($L_2$) and ($L_3$) will inevitably result in increased distortion and astigmatism. On other other hand, an excessively great focal length $f_1$ of the positive lens ($L_1$) will violate the upper limit of condition (2) and will lose an effective ability to correct distortion.

With respect to condition (3), the positive refractive power of surface ($r_2$) will be so strong that over-corrections of lateral chromatic aberration and distortion would result if $|r_2|$ is excessively reduced to violate the lower limit of condition (3). On the contrary, if $|r_2|$ is excessively increased by violating the upper limit of condition (3), the expected use of surface ($r_2$) to correct distortion will not be effective. Additionally, in case that $|r_2|$ is excessively increased, the illumination of the marginal area of the focal plane would be insufficient since the radius of curvature of the front surface ($r_1$) should be positive and inevitably for maintaining the necessary positive refractive power of the lens ($L_1$) required by condition (2). In practice, the combination of conditions (2) and (3) implies that the absolute value for the object side surface ($r_1$) should be greater than that of the image side surface ($r_2$) in the front positive lens ($L_1$).

Condition (4) insures that the positive refractive power of the first positive meniscus lens ($L_5$), which is located next to the aperture stop at the image side thereof, should be relatively great in contrast with the prior art. Lens ($L_5$) is expected to effectively correct spherical aberration and coma, which are principle problems tht occur with an increase in the aperture ratio of the lens system. If $f_5$ is excessively reduced to violate the lower limit of condition (4), an under-correction of spherical aberration and a negatively deviated field curvature result. On the other hand, if $f_5$ is excessively increased to violate the upper limit of condition (4), the correction of coma is difficult unless the total length of the system is increased which is at variance with the design objective of compactness.

The following Tables 1 to 4 show four separate embodiments of the present invention, respectively, wherein FIGS. 1 and 2a, 2b and 2c relate to Table 1; FIGS. 3 and 4a, 4b and 4c relate to Table 2; FIGS. 5 and 6a, 6b and 6c relate to Table 3 and FIGS. 7 and 8a, 8b, and 8c relate to Table 4.

In each Table, f equals the focal length, $2\omega$ equals the field angle, r is the radius of curvature with respective subnumbers indicating the surfaces from the object to image side along the optical axis, d represents the axial distance and includes both the airspaces and the actual thicknesses of the lens components along the optical axis. N equals the refractive index and again the subnumbers refer to the particular optical element from the object to image side and finally, $\nu$, equals the Abbe

TABLE 1

[Embodiment 1]

$f = 100 \quad F_{NO.} = 2.8 \quad 2\omega = 84°$

| Radius of Curvature | | Axial Distance | | Refractive Index | | Abbe Number |
|---|---|---|---|---|---|---|
| $r_1$ | 352.64 | | | | | |
| | | $d_1$ | 9.00 | $N_1$ 1.6935 | $\nu_1$ | 53.6 |
| $r_2$ | 1536.17 | | | | | |
| | | $d_2$ | 0.49 | | | |
| $r_3$ | 96.41 | | | | | |
| | | $d_3$ | 4.00 | $N_2$ 1.5168 | $\nu_2$ | 64.2 |
| $r_4$ | 40.32 | | | | | |
| | | $d_4$ | 22.00 | | | |
| $r_5$ | 128.57 | | | | | |
| | | $d_5$ | 4.00 | $N_3$ 1.5168 | $\nu_3$ | 64.2 |
| $r_6$ | 53.40 | | | | | |
| | | $d_6$ | 23.30 | | | |
| $r_7$ | 112.64 | | | | | |
| | | $d_7$ | 37.00 | $N_4$ 1.7755 | $\nu_4$ | 37.9 |
| $r_8$ | 663.73 | | | | | |
| | | $d_8$ | 10.00 | | | |
| $r_9$ | 1884.56 | | | | | |
| | | $d_9$ | 7.97 | $N_5$ 1.7495 | $\nu_5$ | 50.4 |
| $r_{10}$ | −105.59 | | | | | |
| | | $d_{10}$ | 8.60 | | | |
| $r_{11}$ | −160.09 | | | | | |
| | | $d_{11}$ | 8.65 | $N_6$ 1.8052 | $\nu_6$ | 25.2 |
| $r_{12}$ | 161.28 | | | | | |
| | | $d_{12}$ | 5.00 | | | |
| $r_{13}$ | −326.02 | | | | | |
| | | $d_{13}$ | 8.30 | $N_7$ 1.6214 | $\nu_7$ | 61.4 |
| $r_{14}$ | −73.90 | | | | | |
| | | $d_{14}$ | 0.49 | | | |
| $r_{15}$ | −2270.49 | | | | | |
| | | $d_{15}$ | 7.70 | $N_8$ 1.6583 | $\nu_8$ | 58.6 |
| $r_{16}$ | −127.24 | | | | | |

TABLE 2

[Embodiment 2]

$f = 100 \quad F_{NO.} = 2.8 \quad 2\omega = 84°$

| Radius of Curvature | | Axial Distance | | Refractive Index | | Abbe Number |
|---|---|---|---|---|---|---|
| $r_1$ | 503.02 | | | | | |
| | | $d_1$ | 12.00 | $N_1$ 1.7106 | $\nu_1$ | 43.3 |
| $r_2$ | 8000.00 | | | | | |
| | | $d_2$ | 0.49 | | | |
| $r_3$ | 129.68 | | | | | |
| | | $d_3$ | 4.50 | $N_2$ 1.5168 | $\nu_2$ | 64.1 |
| $r_4$ | 47.32 | | | | | |
| | | $d_4$ | 24.00 | | | |
| $r_5$ | 107.68 | | | | | |
| | | $d_5$ | 4.50 | $N_3$ 1.5168 | $\nu_3$ | 64.1 |
| $r_6$ | 48.74 | | | | | |
| | | $d_6$ | 20.34 | | | |
| $r_7$ | 102.15 | | | | | |
| | | $d_7$ | 26.43 | $N_4$ 1.7755 | $\nu_4$ | 37.9 |
| $r_8$ | 595.24 | | | | | |
| | | $d_8$ | 14.50 | | | |
| $r_9$ | 661.38 | | | | | |
| | | $d_9$ | 7.97 | $N_5$ 1.7425 | $\nu_5$ | 52.5 |
| $r_{10}$ | −157.21 | | | | | |
| | | $d_{10}$ | 8.60 | | | |
| $r_{11}$ | −146.67 | | | | | |
| | | $d_{11}$ | 10.65 | $N_6$ 1.8052 | $\nu_6$ | 25.4 |
| $r_{12}$ | 180.86 | | | | | |
| | | $d_{12}$ | 5.00 | | | |
| $r_{13}$ | −393.08 | | | | | |
| | | $d_{13}$ | 9.50 | $N_7$ 1.6214 | $\nu_7$ | 61.3 |
| $r_{14}$ | −66.72 | | | | | |
| | | $d_{14}$ | 0.49 | | | |
| $r_{15}$ | −726.22 | | | | | |
| | | $d_{15}$ | 7.90 | $N_8$ 1.6583 | $\nu_8$ | 58.5 |
| $r_{16}$ | −116.36 | | | | | |

TABLE 3

[Embodiment 3]

$f = 100 \quad F_{NO.} = 2.8 \quad 2\omega = 84°$

| Radius of Curvature | | Axial Distance | | Refractive Index | | Abbe Number |
|---|---|---|---|---|---|---|
| $r_1$ | 741.89 | | | | | |
| | | $d_1$ | 7.29 | $N_1$ 1.6975 | $\nu_1$ | 48.3 |
| $r_2$ | −9737.10 | | | | | |
| | | $d_2$ | 0.40 | | | |
| $r_3$ | 106.02 | | | | | |
| | | $d_3$ | 5.67 | $N_2$ 1.5168 | $\nu_2$ | 64.1 |
| $r_4$ | 47.11 | | | | | |
| | | $d_4$ | 17.31 | | | |
| $r_5$ | 176.84 | | | | | |
| | | $d_5$ | 5.05 | $N_3$ 1.5168 | $\nu_3$ | 64.1 |
| $r_6$ | 54.71 | | | | | |
| | | $d_6$ | 32.45 | | | |
| $r_7$ | 173.30 | | | | | |
| | | $d_7$ | 20.82 | $N_4$ 1.8340 | $\nu_4$ | 37.1 |
| $r_8$ | 7558.58 | | | | | |
| | | $d_8$ | 18.07 | | | |
| $r_9$ | 130.26 | | | | | |
| | | $d_9$ | 10.88 | $N_5$ 1.6700 | $\nu_5$ | 57.1 |
| $r_{10}$ | −427.84 | | | | | |
| | | $d_{10}$ | 15.47 | | | |
| $r_{11}$ | −665.16 | | | | | |
| | | $d_{11}$ | 7.86 | $N_6$ 1.8052 | $\nu_6$ | 25.4 |
| $r_{12}$ | 109.14 | | | | | |
| | | $d_{12}$ | 4.12 | | | |
| $r_{13}$ | −675.77 | | | | | |
| | | $d_{13}$ | 8.12 | $N_7$ 1.5168 | $\nu_7$ | 64.1 |
| $r_{14}$ | −70.39 | | | | | |
| | | $d_{14}$ | 0.40 | | | |
| $r_{15}$ | −3960.40 | | | | | |
| | | $d_{15}$ | 7.00 | $N_8$ 1.6214 | $\nu_8$ | 61.3 |
| $r_{16}$ | −134.18 | | | | | |

TABLE 4

[Embodiment 4]

$f = 100 \quad F_{NO.} = 2.8 \quad 2\omega = 84°$

| Radius of Curvature | | Axial Distance | | Refractive Index | | Abbe Number |
|---|---|---|---|---|---|---|
| $r_1$ | 656.00 | | | | | |
| | | $d_1$ | 12.00 | $N_1$ 1.7106 | $\nu_1$ | 43.2 |
| $r_2$ | 12987.00 | | | | | |
| | | $d_2$ | 0.49 | | | |
| $r_3$ | 111.09 | | | | | |
| | | $d_3$ | 4.50 | $N_2$ 1.5111 | $\nu_2$ | 60.5 |
| $r_4$ | 48.47 | | | | | |
| | | $d_4$ | 24.00 | | | |
| $r_5$ | 112.17 | | | | | |
| | | $d_5$ | 4.50 | $N_3$ 1.5168 | $\nu_3$ | 64.2 |
| $r_6$ | 50.24 | | | | | |
| | | $d_6$ | 32.58 | | | |
| $r_7$ | 157.13 | | | | | |
| | | $d_7$ | 40.08 | $N_4$ 1.7755 | $\nu_4$ | 37.9 |
| $r_8$ | −803.79 | | | | | |
| | | $d_8$ | 14.50 | | | |
| $r_9$ | 394.63 | | | | | |
| | | $d_9$ | 8.30 | $N_5$ 1.7425 | $\nu_5$ | 52.9 |
| $r_{10}$ | −126.51 | | | | | |
| | | $d_{10}$ | 8.01 | | | |
| $r_{11}$ | −235.87 | | | | | |
| | | $d_{11}$ | 10.65 | $N_6$ 1.8052 | $\nu_6$ | 25.2 |
| $r_{12}$ | 125.80 | | | | | |
| | | $d_{12}$ | 5.00 | | | |
| $r_{13}$ | −250.30 | | | | | |
| | | $d_{13}$ | 9.50 | $N_7$ 1.6214 | $\nu_7$ | 61.4 |
| $r_{14}$ | −82.30 | | | | | |
| | | $d_{14}$ | 0.49 | | | |
| $r_{15}$ | 1750.70 | | | | | |
| | | $d_{15}$ | 7.90 | $N_8$ 1.6583 | $\nu_8$ | 58.6 |
| $r_{16}$ | −160.69 | | | | | |

While the above embodiments have been disclosed as the best modes presently contemplated by the inventors, it should be realized that these examples should not be interpreted as limiting, because artisans skilled in this field, once given the present teachings, can vary from these specific embodiments. Accordingly, the scope of the present invention should be determined solely from the following claims in which we claim.

What is claimed is:

1. An compact lightweight telephoto type wide angle lens system having eight lens groups and eight lens elements comprising from the object to the image side:
   a first lens group consisting of a first positive single lens element;
   a second lens group consisting of a second negative meniscus single lens element convex to the object side;
   a third lens group constituting of a third negative meniscus single lens element convex to the object side;
   a fourth lens group consisting of a fourth positive single lens element;
   a fifth lens group consisting of a fifth biconvex single lens element;
   a sixth lens group consisting of a sixth biconcave single lens element;
   a seventh lens group consisting of a positive meniscus single lens element convex to the image side, and
   an eighth lens group consisting of an eighth positive single lens element, in which the lens system fulfills the following conditions:

$$0.75f < |f_{1,2,3}| < 1.1f \quad f_{1,2,3} < 0$$
$$0.89f < f_{1,2,3,4,5} < 2.3f$$
$$0.5 < d_7/d_6 < 2.0$$
$$1.0 < d_8/d_{10} < 2.4$$

wherein;
$f_{1,2,3}$ represents the total focal length of the first to third single lens element;
$f_{1,2,3,4,5}$ represents the total focal length of the first to fifth single lens element;
$f$ represents the focal length of the entire lens system, and
$d_i$ represents the i-th axial distance numbered consecutively from the front of the lens system.

2. A lightweight compact inverted telephoto type wide angle lens system comprising the following design parameters:

| Radius of Curvature | | f = 100 $F_{NO.}$ = 2.8 $2\omega$ = 84° | | | | | |
|---|---|---|---|---|---|---|---|
| | | Axial Distance | | Refractive Index | | Abbe Number | |
| $r_1$ | 352.64 | | | | | | |
| | | $d_1$ | 9.00 | $N_1$ | 1.6935 | $\nu_1$ | 53.6 |
| $r_2$ | 1536.17 | | | | | | |
| | | $d_2$ | 0.49 | | | | |
| $r_3$ | 96.41 | | | | | | |
| | | $d_3$ | 4.00 | $N_2$ | 1.5168 | $\nu_2$ | 64.2 |
| $r_4$ | 40.32 | | | | | | |
| | | $d_4$ | 22.00 | | | | |
| $r_5$ | 128.57 | | | | | | |
| | | $d_5$ | 4.00 | $N_3$ | 1.5168 | $\nu_3$ | 64.2 |
| $r_6$ | 53.40 | | | | | | |
| | | $d_6$ | 23.30 | | | | |
| $r_7$ | 112.64 | | | | | | |
| | | $d_7$ | 37.00 | $N_4$ | 1.7755 | $\nu_4$ | 37.9 |
| $r_8$ | 663.73 | | | | | | |
| | | $d_8$ | 10.00 | | | | |
| $r_9$ | 1884.56 | | | | | | |
| | | $d_9$ | 7.97 | $N_5$ | 1.7495 | $\nu_5$ | 50.4 |
| $r_{10}$ | −105.59 | | | | | | |
| | | $d_{10}$ | 8.60 | | | | |
| $r_{11}$ | −160.09 | | | | | | |
| | | $d_{11}$ | 8.65 | $N_6$ | 1.8052 | $\nu_6$ | 25.2 |

-continued

| Radius of Curvature | | f = 100 $F_{NO.}$ = 2.8 $2\omega$ = 84° | | | | | |
|---|---|---|---|---|---|---|---|
| | | Axial Distance | | Refractive Index | | Abbe Number | |
| $r_{12}$ | 161.28 | | | | | | |
| | | $d_{12}$ | 5.00 | | | | |
| $r_{13}$ | −326.02 | | | | | | |
| | | $d_{13}$ | 8.30 | $N_7$ | 1.6214 | $\nu_7$ | 61.4 |
| $r_{14}$ | −73.90 | | | | | | |
| | | $d_{14}$ | 0.49 | | | | |
| $r_{15}$ | −2270.49 | | | | | | |
| | | $d_{15}$ | 7.70 | $N_8$ | 1.6583 | $\nu_8$ | 58.6 |
| $r_{16}$ | −127.24 | | | | | | |

3. A lightweight compact inverted telephoto type wide angle lens system comprising the following design parameters:

| Radius of Curvature | | f = 100 $F_{NO.}$ = 2.8 $2\omega$ = 84° | | | | | |
|---|---|---|---|---|---|---|---|
| | | Axial Distance | | Refractive Index | | Abbe Number | |
| $r_1$ | 503.02 | | | | | | |
| | | $d_1$ | 12.00 | $N_1$ | 1.7106 | $\nu_1$ | 43.3 |
| $r_2$ | 8000.00 | | | | | | |
| | | $d_2$ | 0.49 | | | | |
| $r_3$ | 129.68 | | | | | | |
| | | $d_3$ | 4.50 | $N_2$ | 1.5168 | $\nu_2$ | 64.1 |
| $r_4$ | 47.32 | | | | | | |
| | | $d_4$ | 24.00 | | | | |
| $r_5$ | 107.68 | | | | | | |
| | | $d_5$ | 4.50 | $N_3$ | 1.5168 | $\nu_3$ | 64.1 |
| $r_6$ | 48.74 | | | | | | |
| | | $d_6$ | 20.34 | | | | |
| $r_7$ | 102.15 | | | | | | |
| | | $d_7$ | 26.43 | $N_4$ | 1.7755 | $\nu_4$ | 37.9 |
| $r_8$ | 595.24 | | | | | | |
| | | $d_8$ | 14.50 | | | | |
| $r_9$ | 661.38 | | | | | | |
| | | $d_9$ | 7.97 | $N_5$ | 1.7425 | $\nu_5$ | 52.5 |
| $r_{10}$ | −157.21 | | | | | | |
| | | $d_{10}$ | 8.60 | | | | |
| $r_{11}$ | −146.67 | | | | | | |
| | | $d_{11}$ | 10.65 | $N_6$ | 1.8052 | $\nu_6$ | 25.4 |
| $r_{12}$ | 180.86 | | | | | | |
| | | $d_{12}$ | 5.00 | | | | |
| $r_{13}$ | −393.08 | | | | | | |
| | | $d_{13}$ | 9.50 | $N_7$ | 1.6214 | $\nu_7$ | 61.3 |
| $r_{14}$ | −66.72 | | | | | | |
| | | $d_{14}$ | 0.49 | | | | |
| $r_{15}$ | −726.22 | | | | | | |
| | | $d_{15}$ | 7.90 | $N_8$ | 1.6583 | $\nu_8$ | 58.5 |
| $r_{16}$ | −116.36 | | | | | | |

4. A lightweight compact inverted telephoto type wide angle lens system comprising the following design parameters:

| Radius of Curvature | | f = 100 $F_{NO.}$ = 2.8 $2\omega$ = 84° | | | | | |
|---|---|---|---|---|---|---|---|
| | | Axial Distance | | Refractive Index | | Abbe Number | |
| $r_1$ | 741.89 | | | | | | |
| | | $d_1$ | 7.29 | $N_1$ | 1.6975 | $\nu_1$ | 48.3 |
| $r_2$ | −9737.10 | | | | | | |
| | | $d_2$ | 0.40 | | | | |
| $r_3$ | 106.02 | | | | | | |
| | | $d_3$ | 5.67 | $N_2$ | 1.5168 | $\nu_2$ | 64.1 |
| $r_4$ | 47.11 | | | | | | |
| | | $d_4$ | 17.31 | | | | |
| $r_5$ | 176.84 | | | | | | |
| | | $d_5$ | 5.05 | $N_3$ | 1.5168 | $\nu_3$ | 64.1 |
| $r_6$ | 54.71 | | | | | | |
| | | $d_6$ | 32.45 | | | | |
| $r_7$ | 173.30 | | | | | | |
| | | $d_7$ | 20.82 | $N_4$ | 1.8340 | $\nu_4$ | 37.1 |
| $r_8$ | 7558.58 | | | | | | |
| | | $d_8$ | 18.07 | | | | |

-continued

| | | f = 100 | $F_{NO.}$ = 2.8 | $2\omega = 84°$ | | | |
|---|---|---|---|---|---|---|---|
| | Radius of Curvature | | Axial Distance | | Refractive Index | | Abbe Number |
| $r_9$ | 130.26 | | | | | | |
| | | $d_9$ | 10.88 | $N_5$ | 1.6700 | $\nu_5$ | 57.1 |
| $r_{10}$ | −427.84 | | | | | | |
| | | $d_{10}$ | 15.47 | | | | |
| $r_{11}$ | −665.16 | | | | | | |
| | | $d_{11}$ | 7.86 | $N_6$ | 1.8052 | $\nu_6$ | 25.4 |
| $r_{12}$ | 109.14 | | | | | | |
| | | $d_{12}$ | 4.12 | | | | |
| $r_{13}$ | −675.77 | | | | | | |
| | | $d_{13}$ | 8.12 | $N_7$ | 1.5168 | $\nu_7$ | 64.1 |
| $r_{14}$ | −70.39 | | | | | | |
| | | $d_{14}$ | 0.40 | | | | |
| $r_{15}$ | −3960.40 | | | | | | |
| | | $d_{15}$ | 7.00 | $N_8$ | 1.6214 | $\nu_8$ | 61.3 |
| $r_{16}$ | −134.18 | | | | | | |

5. A lightweight compact inverted telephoto type wide angle lens system comprising the following design parameters:

| | | f = 100 | $F_{NO.}$ = 2.8 | $2\omega = 84°$ | | | |
|---|---|---|---|---|---|---|---|
| | Radius of Curvature | | Axial Distance | | Refractive Index | | Abbe Number |
| $r_1$ | 656.00 | | | | | | |
| | | $d_1$ | 12.00 | $N_1$ | 1.7106 | $\nu_1$ | 43.2 |
| $r_2$ | 12987.00 | | | | | | |
| | | $d_2$ | 0.49 | | | | |
| $r_3$ | 111.09 | | | | | | |
| | | $d_3$ | 4.50 | $N_2$ | 1.5111 | $\nu_2$ | 60.5 |
| $r_4$ | 48.47 | | | | | | |
| | | $d_4$ | 24.00 | | | | |
| $r_5$ | 112.17 | | | | | | |
| | | $d_5$ | 4.50 | $N_3$ | 1.5168 | $\nu_3$ | 64.2 |
| $r_6$ | 50.24 | | | | | | |
| | | $d_6$ | 32.58 | | | | |
| $r_7$ | 157.13 | | | | | | |
| | | $d_7$ | 40.08 | $N_4$ | 1.7755 | $\nu_4$ | 37.9 |
| $r_8$ | −803.79 | | | | | | |
| | | $d_8$ | 14.50 | | | | |
| $r_9$ | 394.63 | | | | | | |
| | | $d_9$ | 8.30 | $N_5$ | 1.7425 | $\nu_5$ | 52.9 |
| $r_{10}$ | −126.51 | | | | | | |
| | | $d_{10}$ | 8.01 | | | | |
| $r_{11}$ | −235.87 | | | | | | |
| | | $d_{11}$ | 10.65 | $N_6$ | 1.8052 | $\nu_6$ | 25.2 |
| $r_{12}$ | 125.80 | | | | | | |
| | | $d_{12}$ | 5.00 | | | | |
| $r_{13}$ | −250.30 | | | | | | |
| | | $d_{13}$ | 9.50 | $N_7$ | 1.6214 | $\nu_7$ | 61.4 |
| $r_{14}$ | −82.30 | | | | | | |
| | | $d_{14}$ | 0.49 | | | | |
| $r_{15}$ | 1750.70 | | | | | | |
| | | $d_{15}$ | 7.90 | $N_8$ | 1.6583 | $\nu_8$ | 58.6 |
| $r_{16}$ | −160.69 | | | | | | |

6. An inverted compact telephoto type wide angle lens system comprising from the object to the image side:
   a diverging lens group including at least a front positive lens and a pair of negative meniscus lenses respectively convex to the object side directly subsequent to the front positive lens;
   a converging lens group next to the diverging lens group without any air space therein;
   an aperture stop next to the converging lens group, and
   a final lens group having a positive lens next to the aperture stop at the image side thereof and a plurality of subsequent lenses, in which the lens system fulfills the following conditions:

$0.75f < |f_{1,2,3}| < 1.1f$  $f_{1,2,3} < 0$

-continued $0.89f < f_{1,2,3,4,5} < 2.3f$
$0.5 < d_7/d_6 < 2.0$
$1.0 < d_8/d_{10} < 2.4$ wherein;
$f_{1,2,3}$ represents the total focal length of the diverging lens group;
$f_{1,2,3,4,5}$ represents the total focal length of the lens groups from the front of the system to the positive lens located next to the aperture stop at the image side thereof;
$d_6$ represents an air space between the diverging lens group and the converging lens group;
$d_7$ represents the axial thickness of the converging lens group;
$d_8$ and $d_{10}$ respectively represent an object side and an image side air spaces sandwiching the positive lens next to the aperture stop at the image side thereof, and
f represents the focal length of the whole lens system.

7. The invention of claim 6, wherein the lens system further fulfills the following condition:

$1.5 < d_7/d_9 < 5.2$ wherein;
$d_9$ represents the thickness of the positive lens in the final lens group.

8. The invention of claim 1, wherein the lens system further fulfills the following condition:

$1.5 < d_7/d_9 < 5.2.$

9. An inverted telephoto type wide angle lens system having eight lens groups and eight lens elements comprising from the object to the image side:
   a first lens group consisting of a first positive single lens element;
   a second lens group consisting of a second negative meniscus single lens element convex to the object side;
   a third lens group consisting of a third negative meniscus single lens element convex to the object side;
   a fourth lens group consisting of a fourth positive single lens element;
   a fifth lens group consisting of a fifth biconvex single lens element;
   a sixth lens group consisting of a sixth biconcave single lens element;
   a seventh lens group consisting of a positive meniscus single lens element convex to the image side, and
   an eighth lens group consisting of an eighth positive single lens element, in which the lens system fulfills the following conditions:

$0.75f < |f_{1,2,3}| < 1.1f$  $f_{1,2,3} < 0$
$1.0 < d_8/d_{10} < 2.4$ wherein:
$f_{1,2,3}$ represents the total focal length of the first to third single lens elements;
f represents the focal length of the entire lens system, and
$d_i$ represents the i-th axial distance numbered consecutively from the front of the lens system.

10. The invention of claim 9, wherein the lens system further fulfills the following condition:

$1.5 < d_7/d_9 < 5.2.$

* * * * *

UNITED STATES PATENT AND TRADEMARK OFFICE
CERTIFICATE OF CORRECTION

PATENT NO. : 4,286,847
DATED : September 1, 1981
INVENTOR(S) : Akiyoshi Nakamura and Hisashi Tokumaru It is certified that error appears in the above-identified patent and that said Letters Patent are hereby corrected as shown below:

Column 3, line 3, delete "radii" and insert --radius--.

Claim 1, line 1, delete "An compact lightweight" and

-- An inverted compact lightweight --.

Signed and Sealed this

Nineteenth Day of January 1982

[SEAL]

*Attest:*

*Attesting Officer*

GERALD J. MOSSINGHOFF
*Commissioner of Patents and Trademarks*